United States Patent [19]

Yajima et al.

[11] 4,334,051

[45] Jun. 8, 1982

[54] HEAT RESISTANT POLYVANADIOSILOXANES AND A PROCESS FOR THEIR PRODUCTION

[75] Inventors: Seishi Yajima, Tohoku daigaku shukusha 4-2, 843, Ohnuki-machi, Oharai-machi, Higashubaraki-gun, Ibaraki-ken, Japan; Kiyohito Okamura; Toetsu Shishido, both of Oharai, Japan

[73] Assignee: Seishi Yajima, Japan

[21] Appl. No.: 210,639

[22] Filed: Nov. 26, 1980

[30] Foreign Application Priority Data

Dec. 5, 1979 [JP] Japan .................................. 54-156886
Mar. 31, 1980 [JP] Japan .................................. 55-040304

[51] Int. Cl.$^3$ ............................................. C08G 77/04
[52] U.S. Cl. ........................................ 528/25; 525/474; 525/475; 528/26; 528/27; 528/29
[58] Field of Search .................. 528/25, 27, 26, 29; 525/475, 474

[56] References Cited

U.S. PATENT DOCUMENTS

| | | | |
|---|---|---|---|
| 2,512,058 | 6/1950 | Gulledge et al. | 528/25 |
| 2,517,945 | 8/1950 | Upson | 528/25 |
| 3,226,363 | 12/1965 | Giddings | 528/25 |
| 3,244,645 | 4/1966 | Takimoto et al. | 528/25 |
| 3,764,574 | 10/1973 | Marks et al. | 528/25 |

*Primary Examiner*—Melvyn I. Marquis
*Attorney, Agent, or Firm*—Ladas & Parry

[57] ABSTRACT

A polyvanadiosiloxane being a polymer of which the main chain skeleton consists of Si-O bonds and V-O bonds, characterized by side chains directly attached to the silicon atom being at least one organic group selected from the group consisting of a lower alkyl group, phenyl group, fluoroalkyl group, nitrile group and vinyl group, the vanadium atom being attached to the silicon atom through the oxygen atom and no organic side chain group directly attached to the vanadium atom being present in substance; and a process for the production of a polyvanadiosiloxane which comprises reacting an oily polysiloxane having the main chain skeleton consisting of units of

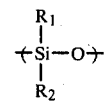

wherein $R_1$ and $R_2$ may be the same or different and stand for a lower alkyl group, phenyl group, fluoroalkyl group, nitrile group or vinyl group, and a vanadium compound by heating at a temperature of 450° C. or less under conditions capable of forming a complex of the vanadium compound.

8 Claims, 3 Drawing Figures

HEAT RESISTANT POLYVANADIOSILOXANES AND A PROCESS FOR THEIR PRODUCTION

BACKGROUND OF THE INVENTION

The present invention relates to heat resistant polyvanadiosiloxanes and a process for their production.

Conventionally, as a polymer with excellent heat resistance polysiloxane is known which is known by the name of silicone. As one example silicone rubber is known as a heat resistant polymer having elasticity even at high temperatures. This silicone rubber is obtained, for instance, by kneading together by mixing organoperoxide (benzoyl peroxide, for instance) with polydimethylsiloxane, followed by molding and causing methylene cross-links by heating in the air. Silicone rubber having part of methyl side chains replaced by alkylfluoro group for the improvement of heat resistance is regarded as usable at maximum 185° C. in the air. However, heat resistant polymers still sustaining elasticity even at higher temperatures is strongly demanded in the field of high temperature engineering. In consequence of studying to meet such demands the instant inventors found novel polyvanadiosiloxanes with further improved heat resistance compared with polysiloxanes because of having V-O bonds strong in thermal vibration in addition to Si-O bonds and a process for their production.

SUMMARY OF THE INVENTION:

The present invention provides a polyvanadiosiloxane being a polymer of which the main chain skeleton consists of Si-O bonds and V-O bonds, characterized by an atomic ratio of silicon atoms to vanadium atoms in the range of 4:1 to 200:1, side chains directly attached to the silicon atom being at least one organic group selected from the group consisting of a lower alkyl group, phenyl group, fluoroalkyl group, nitrile group and vinyl group, the vanadium atom being attached to the silicon atom through the oxygen atom and essentially no organic side chain group directly attached to the vanadium atom being present.

The said polyvanadiosiloxane can be prepared by reacting an oily polysiloxane having the main chain skeleton consisting of units of

wherein $R_1$ and $R_2$ may be the same or different and stand for a lower alkyl group, phenyl group, fluoroalkyl group, nitrile group or vinyl group, and a vanadium compound by heating at a temperature of 450° C. or less under conditions capable of forming a complex of the vanadium compound.

DESCRIPTION OF THE INVENTION

Figure 1:
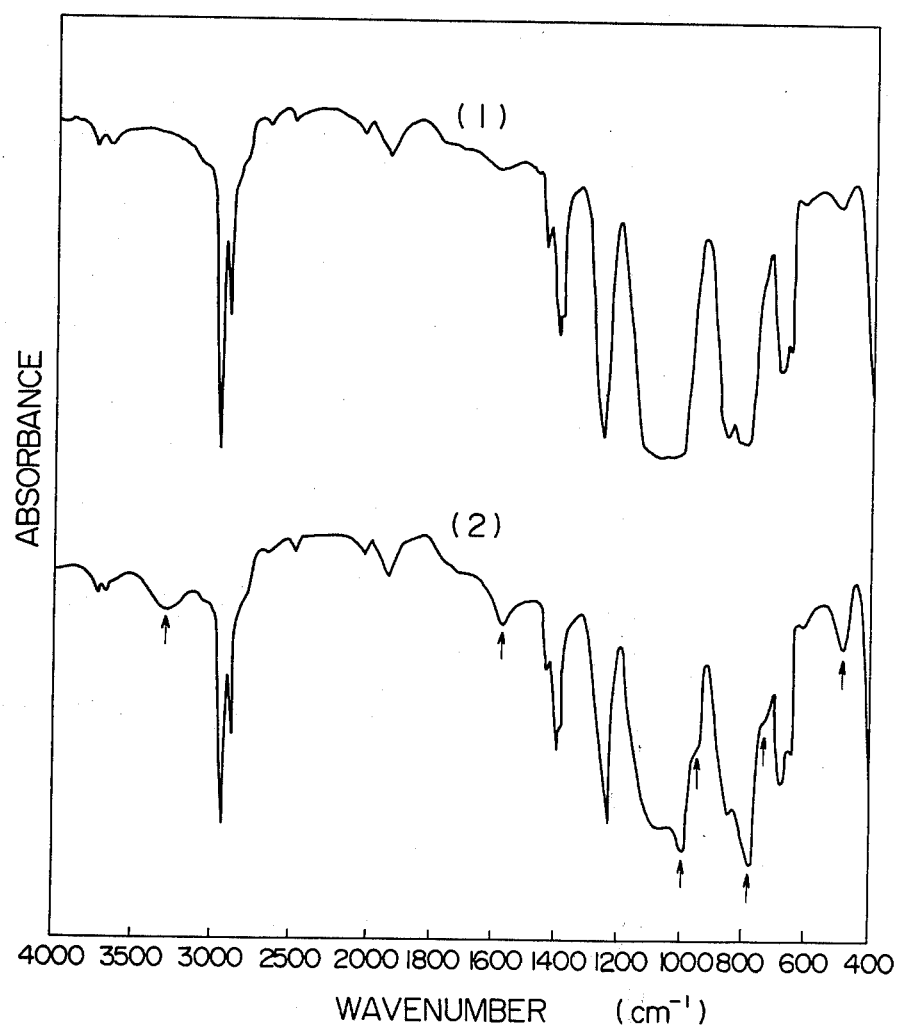
FIG. 1 indicates, by comparison, an infrared absorption spectrum of polysiloxane both terminated and branched with methyl groups used as starting material in the process of Example 1 (curve 1) and an infrared absorption spectrum of polyvanadiosiloxane as end product (curve 2).

Polysiloxane, one of the starting materials for the production of polyvanadiosiloxane of the present invention, is an oily substance in which the main chain skeleton of the polymer consists of structural units of

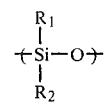

wherein $R_1$ and $R_2$ have the aforesaid meanings, and in general, the viscosity of the oily substance is 1,000,000 centistokes or less. The average polymerization degree of the oily polysiloxane used in the present invention should preferably be 5 to 5000. $R_1$ and $R_2$, side chains attached to the silicon atom of polysiloxane, should preferably be mainly a lower alkyl group with carbon numbers of 1-4 and a methyl group, in particular, but for the improvement of heat resistance it is preferred to have a phenyl group, fluoroalkyl group (wherein the carbon number of alkyl group should preferably be 1-4) or nitrile group in part of $R_1$ and $R_2$ and for the improvement of cross-linkability it is preferred to have a vinyl group in $R_1$ and $R_2$. The silanol type polysiloxane having hydroxyl groups combined at the ends of polymer is suitable for using as starting material because of being rich in reactivity.

The polyvanadiosiloxane of the present invention is prepared by reacting the oily polysiloxane and the vanadium compound by heating at a temperature of 450° C. or less under conditions capable of forming a complex of the vanadium compound. The term "reacting under conditions capable of forming a complex" referred to here means either (i) that the vanadium compound not forming the complex, such as $VCl_4$, is reacted with the polysiloxane in the presence of a compound capable of forming the complex with the vanadium compound (hereinafter called the complex-forming agent) or (ii) that the vanadium compound already forming the complex, such as $VO(CH_2COCH_2COCH_3)_2$, is reacted with the polysiloxane. In the case of (ii) it is not always necessary to conduct the reaction in the presence of the complex-forming agent, but if desired, it may be carried out in the presence of the complex-forming agent.

Examples of vanadium compounds available for the reaction with the polysiloxane include halides, oxyhalides, sulfates, oxysulfates, oxalates and oxyoxalates of vanadium, their alkali metal salts or ammonium salts and acetylacetone complexes of vanadium and the like. For instance, $VCl_4$, $V_2(SO_4)_3$, $VOBr_2$, $Na(VOCl_4)$, $(NH_4)V(SO_4)_2$, $K[VO(C_2O_4)_2]$, $[V(C_5H_7O_2)_3]$ and so forth can be used as vanadium compounds.

Examples of complex-forming agents available in the process of the present invention include ethers, monohydric and polyhydric alcohols, ketones, phenols, heterocyclic compounds containing oxygen as hetero atom, or chain and cyclic compounds possessing the quinone type oxygen, aldehyde group or carboxyl group in the side chain. For instance, $C_2H_5OC_2H_5$, $(CH_2OH)_2$, $CH_3COCH_3$, $C_6H_5OH$, $C_4H_8O$ (tetrahydrofuran), $C_5H_4O_2$ (pyrone), $C_7H_6O$ (benzaldehyde), $C_7H_6O_2$ (benzoic acid), $C_7H_8O$ (benzyl alcohol), $C_5H_8O_2$ (acetylacetone), ethylenediaminetetraacetate (EDTA) and so forth are suitable as complex-forming agents used in the present invention.

The preferred process of the present invention is a process comprising mixing three components of polysiloxane, vanadium compound and complex-forming agent for the vanadium compound and heating the mixture obtained at a temperature of 450° C. or less.

In practising the process of the present invention the composition ratio of polysiloxane and vanadium compound should preferably be such that the ratio of Si atoms of polysiloxane to V atoms of vanadium compound fall in the range of 4:1 to 200:1.

In the case of carrying out the process of (i) above in the presence of the complex-forming agent, using the vanadium compound not forming the complex, the amount of the complex-forming agent used should be at least the amount necessary for the formation of the complex with the vanadium compound and it should preferably be used in great excess of this amount. The reason for this is that the complex-forming agent besides forming the complex with the vanadium compound, usually also functions as the reaction medium and consequently, the complex-forming agent can be advantageously used in great excess for making the reaction proceed smoothly.

In the process of the present invention either inert gases or oxidative gases can be used for the atmosphere at the time of heating. As inert gases $N_2$, Ar and the like are specifically used and as oxidative gases there are preferably used mixed gases, such as mixed gas of nitrogen and oxygen with the partial pressure of oxygen being kept lower than that of air, such as $N_2:O_2=10:1$ (molar ratio). Heating temperatures are set at 450° C. or less and preferably it should fall in the range of 200° to 350° C. In the case of application of heat in the present invention, following modes of practice of heating can be used.

(1) Starting mixture is heated while being kneaded together and heating is stopped at relatively low temperatures→molded→heated at high temperatures.

(2) Starting mixture is kneaded together, then molded and heated.

The infrared absorption spectrum of polyvanadiosiloxane prepared by following the procedures of the present invention is indicated in the curve (2) of FIG. 1. This polyvanadiosiloxane was prepared by reacting polysiloxane both terminated and branched with methyl groups having an average polymerization degree of about 1000 with $VCl_4$ (liquid) in the presence of tetrahydrofuran (complex-forming agent) according to the process set forth in the hereinbelow-described Example 1. In this infrared absorption spectrum there were observed Si-C stretching of $Si(CH_3)_{1-3}$ and absorption by deformation of Si-$CH_3$ at 800-900 cm$^{-1}$ and absorptions of Si-O at 1000-1100 cm$^{-1}$, $Si(CH_3)_2$ at 1260 cm$^{-1}$ and —$CH_3$(C-H) at 1400 cm$^{-1}$ and 2900-3000 cm$^{-1}$. Added to this, new absorptions were further observed at 490 cm$^{-1}$, 740 cm$^{-1}$, 780 cm$^{-1}$, 940 cm$^{-1}$, 1000 cm$^{-1}$, 1580 cm$^{-1}$ and 3300 cm$^{-1}$ and these absorptions indicate the formation of Si-O-V bonds.

From the above experimental results the polyvanadiosiloxane of the present invention is presumed to have the main chain backbone consisting of Si-O bonds and V-O bonds, the vanadium atom being attached to the silicon atom through the oxygen atom and no organic side chain group directly attached to the vanadium atom being present essentially.

The present invention is not bound by the hereinafter-formed theory, but reactions represented by following formulae are considered to be possible as one of reaction mechanisms in which to form the polyvanadiosiloxane of said Example 1.

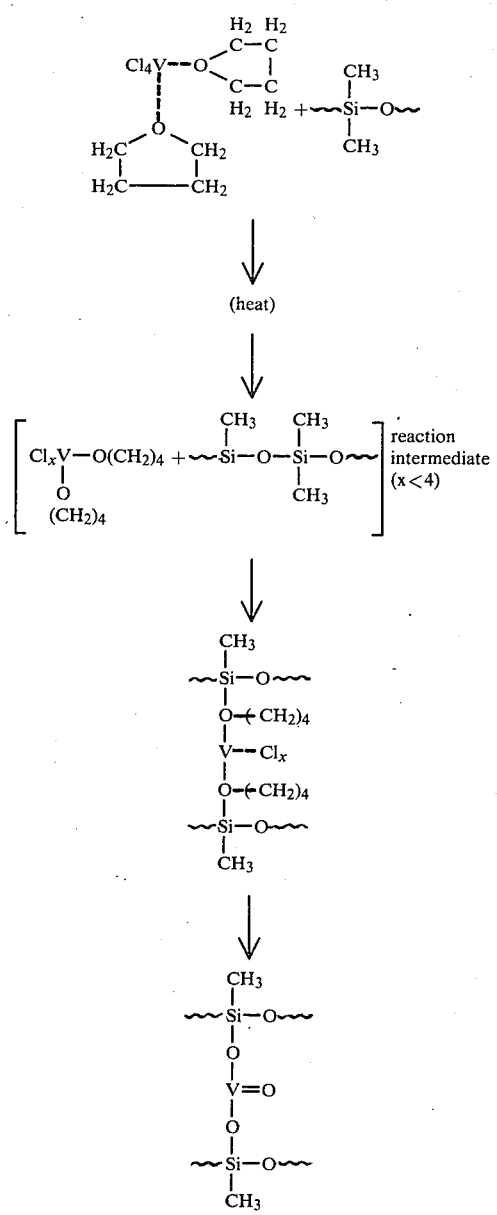

The vanadium atom can have a valence of maximum 5, but because of valence of 3 or valence of 4 is stable in the V-O bond, by the aforesaid reactions the vanadium atom is considered to attach to part of the silicon atoms of polydimethylsiloxane through the oxygen atom in such various forms as indicated by (1)–(5) below.

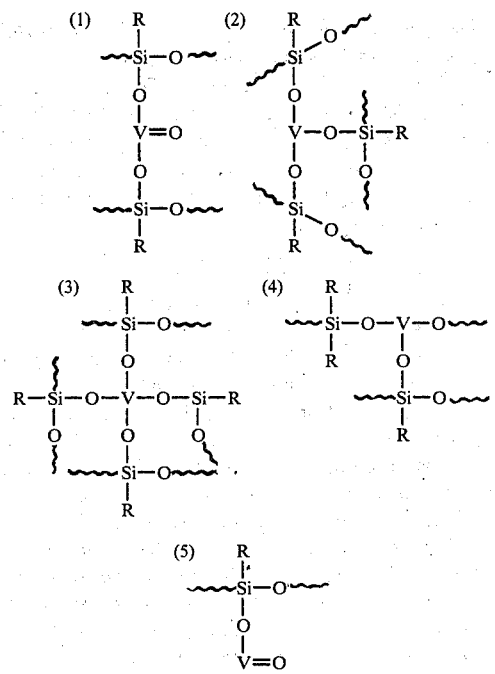

(1) to (3) indicate the case where the main chains of polysiloxane are cross-linked by the V-O bond, (4) indicates the case where the V-O bond is incorporated into the main chain of polysiloxane and (5) indicates the case where the V-O bond is present as a pendant group in the main chain of polysiloxane. In this connection, for V-O bond units of (1) to (5) those in a form of $\sim$Si-O$+$V-O$)_{\overline{n}}$Si-O$\sim$ in which 2 V-O bonds or more are joined together will also be possible.

In the case where the polysiloxane used as starting material is terminated with the diol type group, the incorporation of the V-O bond into the main chain of polysiloxane is liable to occur and also in the case where the polysiloxane is severed by thermal vibration during the process of heating, the incorporation of the V-O bond into the main chain readily takes place.

Since the V-O bond is strong in the thermal vibration, the polyvanadio-siloxane of the present invention is a substance with excellent heat resistance.

The atomic ratio of Si and V composing the polyvanadiosiloxane of the present invention should preferably fall in the range of 4:1 to 200:1. If this atomic ratio is kept great, the polyvanadiosiloxane obtained shows properties of rubbery elastomer, whereas if this atomic ratio is kept low, the polyvanadiosiloxane obtained shows properties as resin.

In the production of the polyvanadiosiloxane of the present invention organoperoxide, such as benzoyl peroxide or dicumyl peroxide, may be used for the purpose of promoting the cross-linking of the $+$V-O$+$ bond or filler, such as $SiO_2$ or ZnO, may be used for the purpose of developing the reinforced effect in the case of aiming at obtaining the reaction product as the molded body.

The polyvanadiosiloxane of the present invention is flame retardant and does not deteriorate even if used for long hours at 180°-280° C. in the air. When measured at room temperature, elongation falls in the range of 10 to 150 (%) and in general, the higher the proportions of $+$V-O$+$ bonds introduced in the polyvanadiosiloxane, the lower the elongation. Tensile strength falls in the range of 20-100 (kg/cm$^2$) and hardness in the range of 30-70 in the JISA measurement. Further, it has brittle points of $-60°$ C. or less in either case and is excellent in cold resistance as well. The polyvanadiosiloxane of the present invention, with a small number of $+$V-O$+$ bonds can find usages as rubber, whereas the polyvanadiosiloxane of the present invention with a great number of $+$V-O$+$ bonds can find usages as resin. Specifically, it can be applied to seal, gasket, diaphragm, hose, foam, coating, antivibration material, heat resistant wire, electrical part material and so forth from which heat resistance is expected in the fields of space developments, aircrafts, automobiles and the like.

The present invention will be explained by way of examples as follows.

EXAMPLE 1

250 c.c. of a solution of 25 g of $VCl_4$ dissolved in 500 c.c. of tetrahydrofuran was separated and added to 300 g of a polysiloxane both terminated and branched with methyl groups and having an average polymerization degree of 1000. The mixture was heated to 180° C. while stirring in the air and stirring and heating were stopped when the contents went highly viscous. After that, the atmosphere was replaced by argon gas and the mixture was further heated to 400° C. and held at this temperature for 2 hours whereby polyvanadiosiloxane elastomer was obtained.

FIG. 1 indicates difference in the infrared absorption spectra before and after the reaction. In FIG. 1, curve (1) is the infrared absorption spectrum of starting material polydimethylsiloxane and curve (2) is the infrared absorption spectrum of polyvanadiosiloxane. It is noted from a comparison made between curve (1) and curve (2) that new absorptions occur by the reaction at 490 cm$^{-1}$, 740 cm$^{-1}$, 780 cm$^{-1}$, 940 cm$^{-1}$, 1000 cm$^{-1}$, 1580 cm$^{-1}$ and 3300 cm$^{-1}$ (these absorptions are indicated by arrows in curve (2)). These new absorptions indicate the formation of Si-O-V bonds.

Chemical analysis showed the atomic ratio of Si to V in the said polyvanadiosiloxane to be 60:1. Observations made by electron microscope showed that crystal particles were not present in the bright field images and that no solid vanadium oxide formed. It was noted from these facts that elemental vanadium participated all in the Si-O-V bonds.

Figure 2:
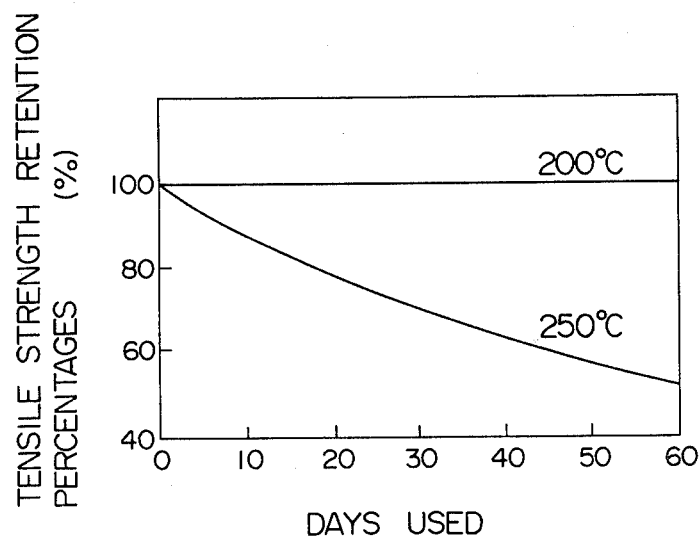
FIG. 2 indicates curves showing heat resistance of polyvanadiosiloxane prepared by the process of Example 1.

The said polyvanadiosiloxane can be used as elemental rubber. By the addition of 30 parts after weight of silicon oxide as filler and 0.5 part by weight of 2,5-dimethyl-2,5-bis(t-butylperoxy)hexane as cross-linking agent the mixture was cold kneaded together by means of a pair of rolls, then placed in a metal mold and heated to 300° C. while being pressed whereby there was obtained rubber shaped article. Rubber obtained was low in compression permanent set, rich in oil resistance and excellent in heat resistance, in particular. FIG. 2 indicates heat resistant aging.

EXAMPLE 2

Figure 3:
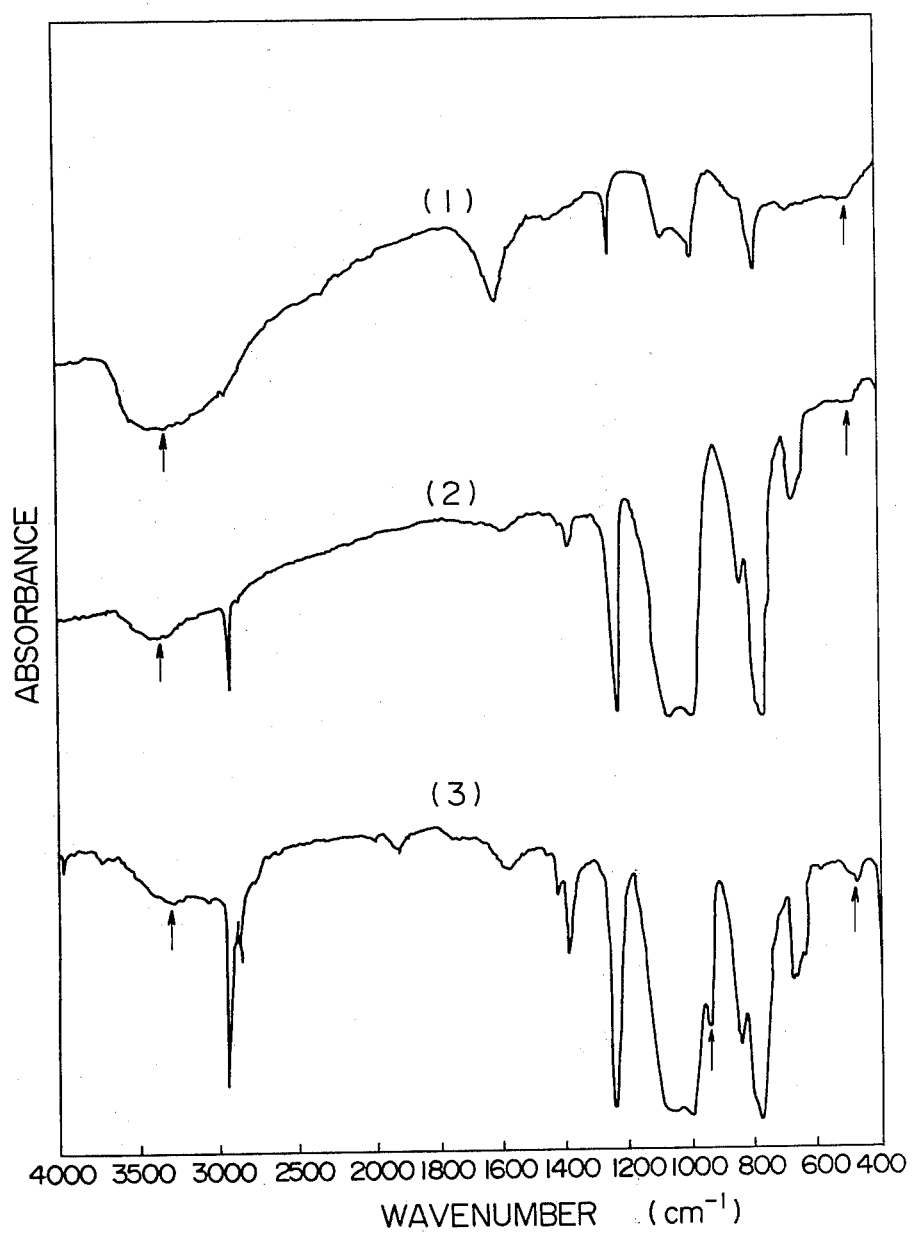
FIG. 3 indicates infrared absorption spectra of substances of the respective phases in the polyvanadiosiloxane obtained by the process of Example 2 as mixture comprising three phases.

2.5 g of $VCl_4$ and 50 c.c. of tetrahydrofuran were added to 40 g of polysiloxane both terminated and branched with methyl groups and having a viscosity of 1,000,000 centistokes and the mixture was heated, at 180° C. for 2 hours while stirring in the air. As a result, there was obtained polyvanadiosiloxane comprising mixed phase of dark green solids (1), brown oily substance (2) and green highly viscous liquid (3). FIG. 3 indicates their respective infrared absorption spectra.

Those portions indicated by arrows in the diagram indicate V-O-Si bonds centering around vanadium with valence of 3, in particular. The polyvanadiosiloxane (mixed phase) obtained in the instant example is rich in reaction activity, forming a precursor used in the synthesis of highly cross-linked polyvanadiosiloxane.

EXAMPLE 3

28 g of VO(CH$_2$COCH$_2$COCH$_3$)$_2$ and 200 c.c. of acetylacetone were added to 300 g of polysiloxane terminated all with methyl groups and branched substituted with both methyl groups and phenyl groups (ratio of methyl groups to phenyl groups being 5:1) and having an average polymerization degree of 800 and the mixture was heated to 180° C. while stirring in the air and heating and stirring were stopped when the contents went highly viscous. The said compound was placed in a metal mold and heated to 320° C. while being pressed in the air. Elastomer obtained had the infrared absorption spectrum similar to curve (2) of FIG. 1 and it was polysiloxane cross-linked by Si.O.V. bonds. Chemical analysis showed the atomic ratio of Si to V to be 33:1. This elastomer did not lose its elasticity even if heated at 300° C. for 48 hours in the airs.

EXAMPLE 4

Synthesis was effected at the same conditions as used in Example 3 except that 41 g of V$_2$(SO$_4$)$_3$ was used instead of 28 g of VO(CH$_2$COCH$_2$COCH$_3$)$_2$, with the result that there was obtained elastomer having nearly the same heat resistant function as obtained in Example 3.

EXAMPLE 5

400 c.c. of a solution of 25 g of VCl$_4$ dissolved in 1 l of tetrahydrofuran was separated and added to 300 g of polysiloxane having one hydroxyl group at each end with methyl groups attached to the remaining bonds of the Si atoms at each end and to all side chains, and having an average polymerization degree of 500. The said starting material was placed in a reaction vessel equipped with a tetrahydrofuran recovering apparatus, stirred by means of a stirrer while passing through a gas containing nitrogen and oxygen in a ratio of N$_2$:O$_2$=10:1, heated to about 180° C. and heating was stopped when the contents went highly viscous. The contents were taken out and kneaded by means of a pair of rolls into a sheet. Then it was heated to 300° C. in the same N$_2$ and O$_2$ mixed gas stream as the above and held at this temperature for 5 hours whereby there was obtained polyvanadiosiloxane elastomer. This elastomer did not lose its elasticity even if heated at 300° C. for 48 hours in the air.

EXAMPLE 6

300 g of polysiloxane having one hydroxyl group at each end with methyl groups attached to the remaining bonds of the Si atoms at each end and to all side chaims, and having an average polymerization degree of 1250 was used as polysiloxane and 500 c.c. of a solution of 25 g of VCl$_4$ dissolved in 1 l of tetrahydrofuran was separated and added and the same treatment as in Example 5 was effected with the result that there was obtained polyvanadiosiloxane having nearly the same heat resistant function as obtained in Example 5.

EXAMPLE 7

300 g of polysiloxane both terminated and branched with methyl groups and having an average polymerization degree of 3000 was used and 700 c.c. of a solution of 25 g of VCl$_4$ dissolved in 1 l of tetrahydrofuran was separated and added to conduct the same treatment as in Example 5, with the result that there was obtained heat resistant resin not softened nor cured even if used at 250° C. for long hours in the air.

EXAMPLE 8

300 c.c. of a solution of 25 g of VCl$_4$ dissolved in 1 l of tetrahydrofuran was added to 300 g of polysiloxane both terminated and branched with methyl groups and having an average polymerization degree of 750 and after further addition of 100 g of finely divided SiO$_2$ the mixture was heated and kneaded at 130° C. in the air. After that, the mixture was once again heated to 130° C. and kneaded by the addition of 15 g of benzoyl peroxide. The mixture so obtained was molded into a sheet and then it was held at 350° C. for 3 hours in a gas stream of N$_2$:O$_2$=10:1 whereby there was obtained polyvanadiosiloxane. This polyvanadiosiloxane was 30% in the elongation percentage and 20 kg/cm$^2$ in the tensile strength at room temperature.

EXAMPLE 9

10 g of V$_2$(SO$_4$)$_3$ and 200 c.c. of acetylacetone were mixed to 300 g of polysiloxane having one hydroxyl group at each end with methyl groups attached to the remaining bonds of the Si atoms at each end and to all side chaims, and having an average polymerization degree of 1000 to conduct the same heating operation as in Example 5, with the result that there was obtained polyvanadiosiloxane having nearly the same heat resistant function as obtained in Example 5.

We claim:
1. A polyvanadiosiloxane being a polymer of which the main chain skeleton consists of Si-O bonds and V-O bonds, characterized by side chains directly attached to the silicon atom being at least one organic group selected from the group consisting of a lower alkyl group, phenyl group, fluoroalkyl group, nitrile group and vinyl group, the vanadium atom being attached to the silicon atom through the oxygen atom and essentially no organic side chain group directly attached to the vanadium atom being present.

2. A polyvanadiosiloxane according to claim 1 in which the lower alkyl group is a methyl group.

3. A polyvanadiosiloxane according to claim 1 in which the atomic ratio of silicon atoms to vanadium atoms falls in the range of 4:1 to 200:1.

4. A process for the production of a polyvanadiosiloxane which comprises reacting an oily polysiloxane having the main chain skeleton consisting of units of

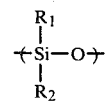

wherein R$_1$ and R$_2$ may be the same or different and stand for a lower alkyl group, phenyl group, fluoroalkyl group, nitrile group or vinyl group, and a vanadium compound by heating at a temperature of 450° C. or less under conditions capable of forming a complex of the vanadium compound.

5. A process according to claim 4 which comprises reacting the polysiloxane and the vanadium compound in the presence of a compound capable of forming a complex with the vanadium compound.

6. A process according to claim 5 which comprises mixing the polysiloxane, and vanadium compound and the compound capable of forming the complex and heating the mixture obtained.

7. A process according to claim 4 in which the quantitative ratio of the polysiloxane to the vanadium compound falls in the range of 4:1 to 200:1 as the atomic ratio of Si atoms of polysiloxane to V atoms of vanadium compound.

8. A process according to claim 4 in which the reaction temperature falls in the range of 200° to 350° C.

* * * * *